US011915710B2

(12) United States Patent
Tu et al.

(10) Patent No.: US 11,915,710 B2
(45) Date of Patent: Feb. 27, 2024

(54) CONFERENCE TERMINAL AND EMBEDDING METHOD OF AUDIO WATERMARKS

(71) Applicant: Acer Incorporated, New Taipei (TW)

(72) Inventors: Po-Jen Tu, New Taipei (TW); Jia-Ren Chang, New Taipei (TW); Kai-Meng Tzeng, New Taipei (TW)

(73) Assignee: Acer Incorporated, New Taipei (TW)

(*) Notice: Subject to any disclaimer, the term of this patent is extended or adjusted under 35 U.S.C. 154(b) by 0 days.

(21) Appl. No.: 17/402,623

(22) Filed: Aug. 16, 2021

(65) Prior Publication Data

US 2022/0406317 A1 Dec. 22, 2022

(30) Foreign Application Priority Data

Jun. 22, 2021 (TW) ................................ 110122715

(51) Int. Cl.
*G10L 19/018* (2013.01)
*G10L 13/02* (2013.01)

(52) U.S. Cl.
CPC ............ *G10L 19/018* (2013.01); *G10L 13/02* (2013.01)

(58) Field of Classification Search
CPC .............................. G10L 19/018; G10L 13/02
See application file for complete search history.

(56) References Cited

U.S. PATENT DOCUMENTS 9,798,754 B1* 10/2017 Shilane ............... G06F 11/3037
11,362,833 B2* 6/2022 Rolf .................... G06F 7/49942
2002/0078357 A1* 6/2002 Bruekers ............. H04N 19/467 704/E19.009
2011/0039506 A1* 2/2011 Lindahl ................... G10L 19/20 704/500
2017/0025129 A1* 1/2017 Blesser ................. G10L 19/018
2019/0287513 A1* 9/2019 Alameh .................. G10L 17/00
2020/0302036 A1* 9/2020 Khan ...................... G06F 21/16
2022/0239847 A1* 7/2022 Swierk ................... G06N 3/084

FOREIGN PATENT DOCUMENTS

DE 60225894 T2 * 4/2009 ........... G06T 1/0021
JP 2004512782 A * 4/2004
JP 2018073227 A * 5/2018
JP 2020068403 A * 4/2020
TW 202038631 10/2020
WO WO-2010025779 A1 * 3/2010 ............ H04H 20/31

* cited by examiner

*Primary Examiner* — Pierre Louis Desir
*Assistant Examiner* — Keisha Y. Castillo-Torres
(74) *Attorney, Agent, or Firm* — JCIPRNET

(57) ABSTRACT

A conference terminal and an embedding method of audio watermarks are provided. In the method, a first speech signal and a first audio watermark signal are received respectively. The first speech signal relates to a speaker corresponding to another conference terminal, and the first audio watermark signal corresponds to the another conference terminal. The first speech signal is assigned to a host path to output a second speech signal. The first audio watermark signal is assigned to an offload path to output a second audio watermark signal. The host path provides more digital signal processing (DSP) effects than the offload path. The second speech signal and the second audio watermark signal are synthesized to output a synthesized audio signal. The synthesized audio signal is adapted for audio playback. A completed audio watermark signal is outputted accordingly.

10 Claims, 5 Drawing Sheets

CONFERENCE TERMINAL AND EMBEDDING METHOD OF AUDIO WATERMARKS

CROSS-REFERENCE TO RELATED APPLICATION

This application claims the priority benefit of Taiwan application serial no. 110122715, filed on Jun. 22, 2021. The entirety of the above-mentioned patent application is hereby incorporated by reference herein and made a part of this specification.

BACKGROUND

Technical Field

The disclosure relates to a speech conference technology, particularly to a conference terminal and an embedding method of audio watermarks.

Description of Related Art

Remote conferences enable people at different locations or in different spaces to have conversations, and conference-related equipment, protocols, and/or applications are also well developed. It is worth noting that some real-time conference programs may synthesize speech signals and audio watermark signals. However, speech signal processing technologies (for example, frequency band filtering, noise suppression, dynamic range compression (DRC), echo cancellation, etc.) are generally designed for general speech signals, retaining only speech signals while removing non-speech signals. If the speech signal and the audio watermark signal undergo the same speech signal processing on the signal transmission path, the audio watermark signal may be treated as noise or non-speech signals and thus being filtered.

SUMMARY

In this light, the embodiments of the present disclosure provide a conference terminal and an embedding method of audio watermarks. The audio watermark is embedded in the terminal to retain the audio watermark through multiple paths.

The embedding method of audio watermarks in the embodiment of the present disclosure is suitable for conference terminals. The embedding method of audio watermarks includes (but is not limited to) the following steps: receiving a first speech signal and a first audio watermark signal respectively, wherein the first speech signal relates to a phonetic content of a speaker corresponding to another conference terminal, and the first audio watermark signal corresponds to the another conference terminal; assigning the first speech signal to a host path to output a second speech signal, and assigning the first audio watermark signal to an offload path to output a second audio watermark signal, wherein the host path provides more digital signal processing (DSP) effects than the offload path; and synthesizing the second speech signal and the second audio watermark signal to output a synthesized audio signal, wherein the synthesized audio signal is adapted for audio playback.

The conference terminal of the embodiment of the present disclosure includes (but is not limited to) a sound receiver, a loudspeaker, a communication transceiver, and a processor. The sound receiver is adapted to receive sound. The loudspeaker is adapted to play sound. The communication transceiver is adapted to transmit or receive data. The processor is coupled to the sound receiver, the loudspeaker, and the communication transceiver. The processor is adapted to receive a first speech signal and a first audio watermark signal respectively through the communication transceiver, assign the first speech signal to a host path to output a second speech signal, and assign the first audio watermark signal to an offload path to output a second audio watermark signal, and synthesize the second speech signal and the second audio watermark signal to output a synthesized audio signal. The first speech signal relates to a phonetic content of a speaker corresponding to another conference terminal, and the first audio watermark signal corresponds to the another conference terminal. The host path provides more digital signal processing effects than the offload path. The synthesized audio signal is adapted for audio playback.

Based on the above, the conference terminal and the embedding method of audio watermarks according to the embodiment of the present disclosure, two transmission paths are provided at the terminal for the speech signal and the audio watermark signal, so that the audio watermark signal receives less signal processing to synthesize the signal accordingly. In this way, the conference terminal may completely play out the speech signal and the audio watermark signal of the speaker at the other terminal, which reduces the noise in the environment.

In order to make the above-mentioned features and advantages of the present disclosure more comprehensible, the following specific embodiments are described in detail in conjunction with the accompanying drawings.

DESCRIPTION OF THE EMBODIMENTS

Figure 1:
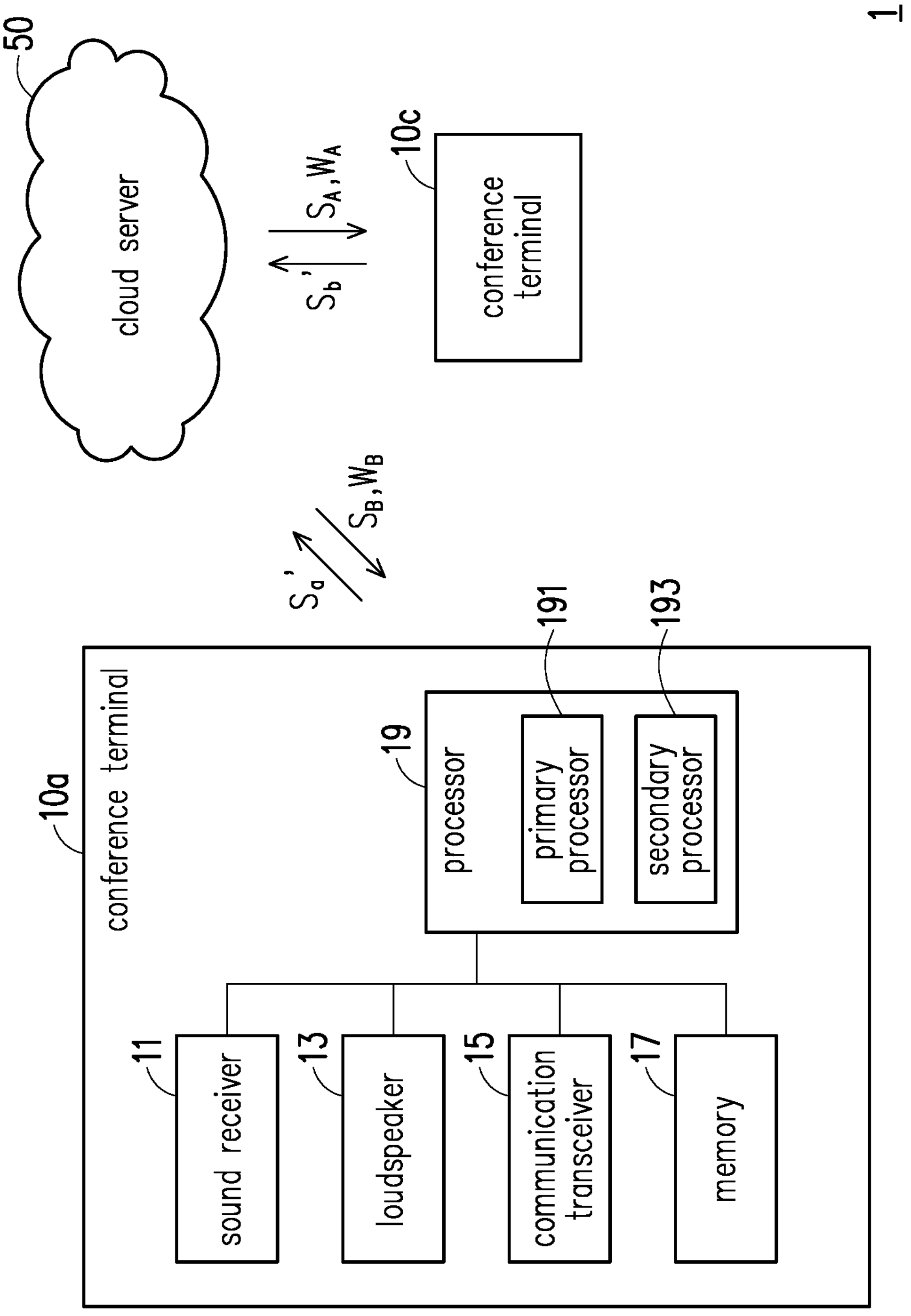
FIG. 1 is a schematic diagram of a conference system according to an embodiment of the present disclosure.

FIG. 1 is a schematic diagram of a conference system 1 according to an embodiment of the present disclosure. In FIG. 1, the conference system 1 includes (but is not limited to) a plurality of conference terminals 10*a* and 10*c* and a cloud server 50.

Each conference terminals 10*a* and 10*c* may be a wired phone, a mobile phone, a tablet computer, a desktop computer, a notebook computer, or a smart speaker. Each of the conference terminals 10*a* and 10*c* includes (but is not limited to) a sound receiver 11, a loudspeaker 13, a communication transceiver 15, a memory 17, and a processor 19.

The sound receiver 11 can be a dynamic, condenser, or electret condenser sound receiver. The sound receiver 11 may also be a combination of other electronic components, analog-to-digital converters, filters, and audio processors that can receive sound waves (for example, human voice, environmental sound, machine operation sound, etc.) and convert them into speech signals. In one embodiment, the sound receiver 11 is adapted to receive/record the sound of the speaker to obtain the speech signals. In some embodiments, the speech signal may include the voice of the speaker, the sound emitted by the loudspeaker 13, and/or other environmental sounds.

The loudspeaker 13 may be a speaker or a loudspeaker. In one embodiment, the loudspeaker 13 is adapted to play sound.

The communication transceiver 15 is, for example, a transceiver that supports a wired network such as Ethernet, optical fiber network, or cable (which may include (but is not limited to) connection interfaces, signal converters, communication protocol processing chips, and other components)), and it may also be a transceiver that supports Wi-Fi, fourth-generation (4G), fifth-generation (5G), or later generation mobile networks, and other wireless networks (which may include (but are not limited to) antennas, digital-to-analog/analog-to-digital converters, communication protocol processing chips, and other components). In one embodiment, the communication transceiver 15 is adapted to transmit or receive data.

The memory 17 may be any type of fixed or removable random access memory (RAM), read only memory (ROM), flash memory, hard disk drive (HDD), solid-state drive (SSD), or similar components. In one embodiment, the memory 17 is adapted to record program codes, software modules, configuration arrangement, data (for example, audio signals), or files.

The processor 19 is coupled to the sound receiver 11, the loudspeaker 13, the communication transceiver 15, and the memory 17. The processor 19 may be a central processing unit (CPU), a graphics processing unit (GPU), or other programmable general-purpose or special-purpose microprocessors, digital signal processing (DSP), programmable controller, field programmable gate array (FPGA), application-specific integrated circuit (ASIC), or other similar components or a combination of the above devices. In one embodiment, the processor 19 is adapted to perform all or part of the operations of the conference terminals 10*a* and 10*c*, and may load and execute various software modules, files, and data recorded in the memory 17.

In an embodiment, the processor 19 includes a primary processor 191 and a secondary processor 193. For example, the primary processor 191 is a CPU, and the secondary processor 193 is a platform controller hub (PCH) or other chips or processors with lower power consumption than the CPU. However, in some embodiments, the functions and/or elements of the primary processor 191 and the secondary processor 193 may be integrated.

The cloud server 50 is directly or indirectly connected to the conference terminals 10*a* and 10*c* via the network. The cloud server 50 may be a computer system, a server, or a signal processing device. In an embodiment, the conference terminals 10*a* and 10*c* may also serve as the cloud server 50. In another embodiment, the cloud server 50 may be used as an independent cloud server different from the conference terminals 10*a* and 10*c*. In some embodiments, the cloud server 50 includes (but is not limited to) the same or similar communication transceiver 15, memory 17, and processor 19, and the implementation modes and functions of the components will not be repeated herein.

Various devices, components, and modules in the conference system 1 are used to describe the method according to the embodiments of the present disclosure hereinafter. Each process of the method can be adjusted accordingly according to the practical implementation situation, and is not limited to this.

In addition, it should be noted that, for the convenience of description, the same components can implement the same or similar operations, and the same description will not be repeated herein. For example, the processor 19 of the conference terminals 10*a* and 10*c* can all implement the same or similar methods in the embodiments of the present disclosure.

Figure 2:
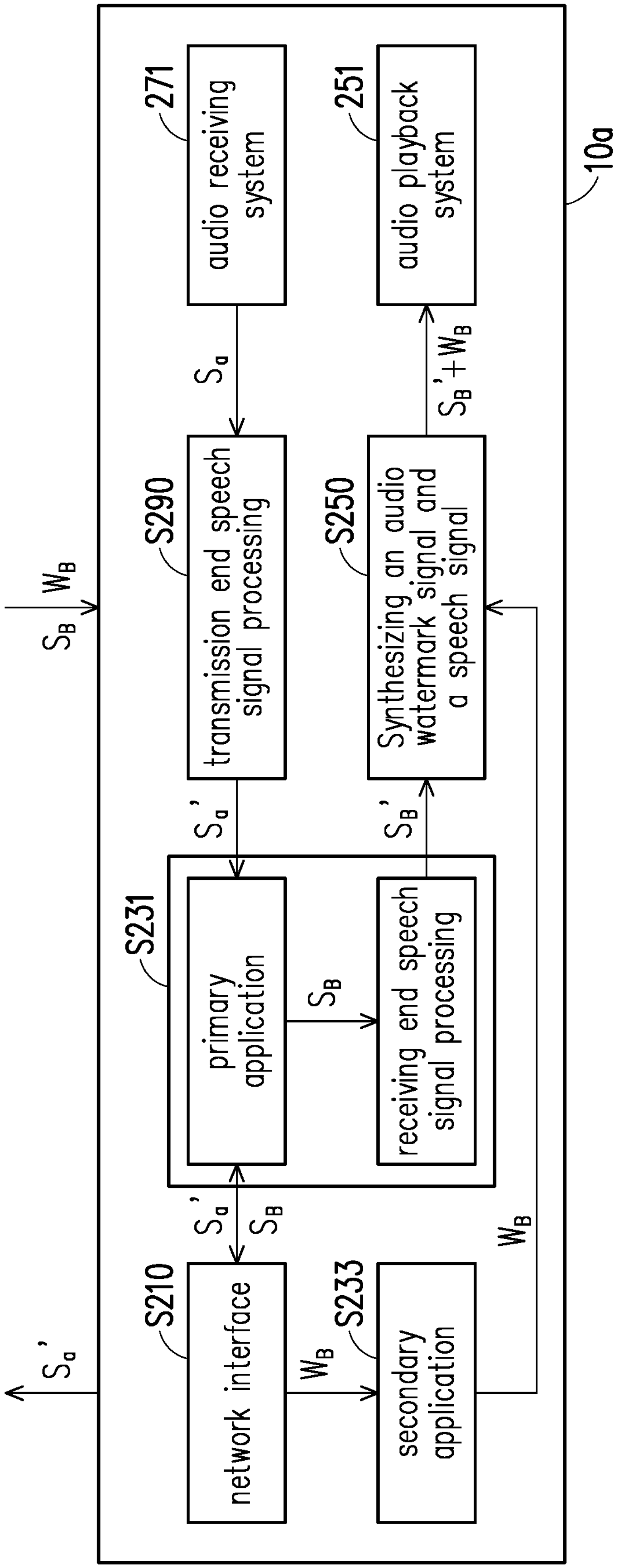
FIG. 2 is a flowchart of an embedding method of audio watermarks according to an embodiment of the present disclosure.

FIG. 2 is a flowchart of an embedding method of audio watermarks according to an embodiment of the present disclosure. In FIG. 1 and FIG. 2, it is assumed that the conference terminals 10*a* and 10*c* create a call conference. For example, by setting up a meeting through video software, voice call software, or by making a phone call, the speaker may then start talking. The processor 19 of the conference terminal 10*a* receives a speech signal $S_B$ and an audio watermark signal $W_B$ through the communication transceiver 15 (i.e., via a network interface) (step S210). Specifically, the speech signal $S_B$ relates to the phonetic content of the speaker corresponding to the conference terminal 10*c* (for example, the speech signal obtained by the sound receiver 11 of the conference terminal 10*c* receiving signals from the speaker). The audio watermark signal $W_B$ corresponds to the conference terminal 10*c*.

Figure 3:
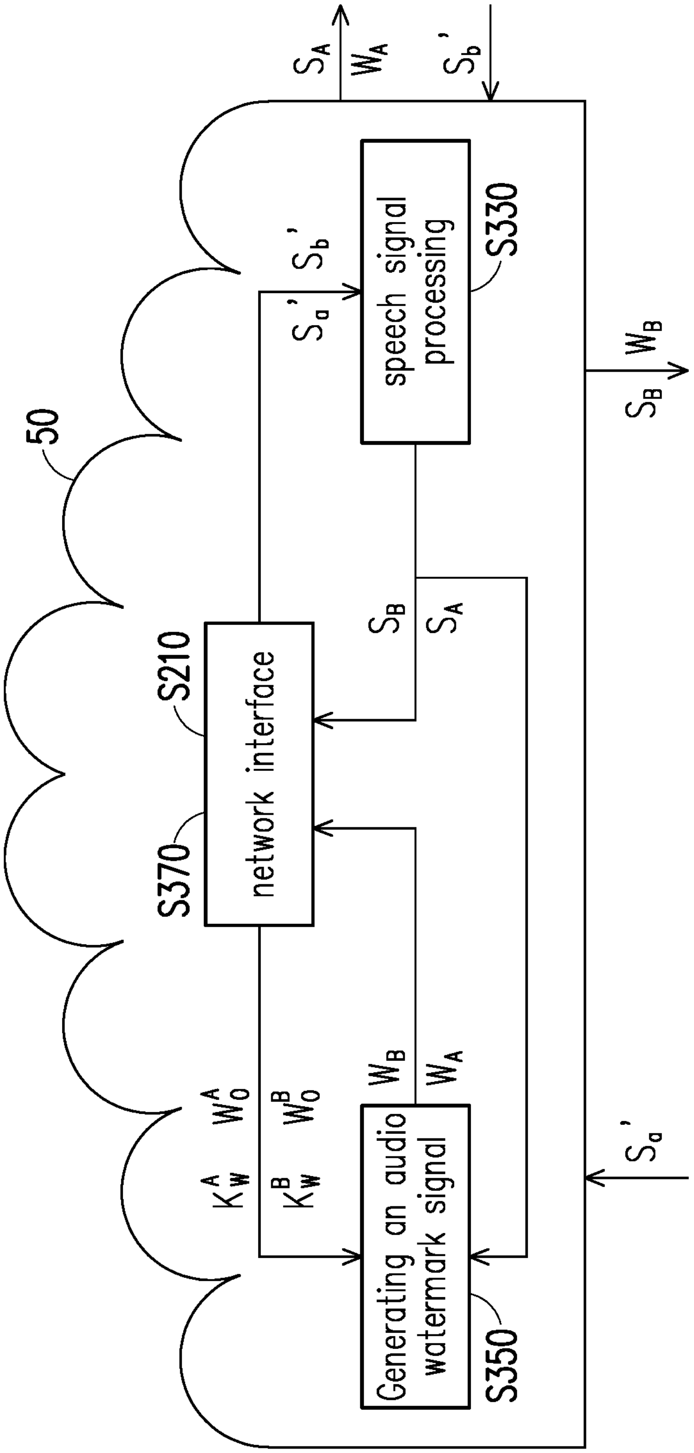
FIG. 3 is a flowchart of the generation of a speech signal and an audio watermark signal according to an embodiment of the present disclosure.

For example, FIG. 3 is a flowchart of the generation of the speech signal $S_B$ and the audio watermark signal $W_B$ according to an embodiment of the present disclosure. In FIG. 3, the cloud server 50 receives a speech signal $S_b'$ recorded by the conference terminal 10*c* through its sound receiver 11 via the network interface (step S310). The speech signal $S_b'$ may include the voice of the speaker, the sound played by the loudspeaker 13, and/or other environmental sounds. The cloud server 50 may perform speech signal processing like noise suppression and gain adjustment on the speech signal $S_b'$ (step S330), and generate the speech signal $S_B$ accordingly. However, in some embodiments, it is also possible to omit the speech signal processing and directly use the speech signal $S_b'$ as the speech signal $S_B$.

Figure 4:
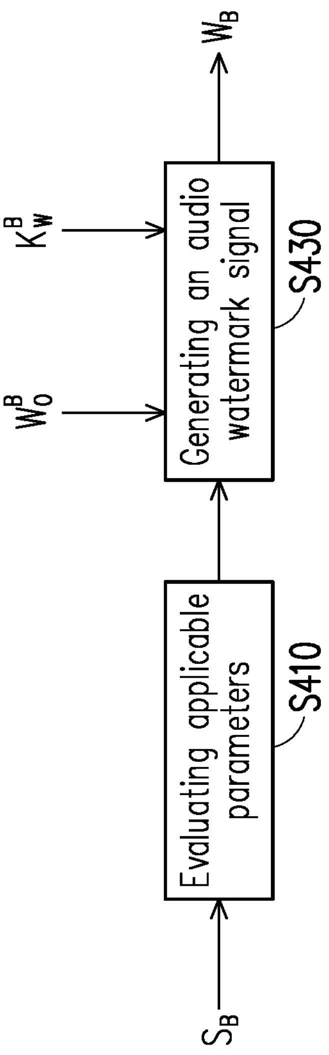
FIG. 4 is a flowchart illustrating the generation of an audio watermark signal according to an embodiment of the present disclosure.

And the cloud server 50 may generate the audio watermark signal $W_B$ for the conference terminal 10*c* based on the speech signal $S_B$. Specifically, FIG. 4 is a flowchart of the generation of the audio watermark signal $W_B$ according to an embodiment of the present disclosure. In FIG. 4, the cloud server 50 evaluates the applicable parameters (for example, gain, time difference, and/or frequency band) of the watermark through a psychoacoustics model (step S410). The psychoacoustic model is a mathematical model that imitates the human hearing mechanism, and can be used to derive frequency bands that cannot be heard by human ears. The cloud server 50 may generate an audio watermark signal $W_B$ based on an original watermark $w_0^B$ and a watermark key $k_w^B$ to be transmitted (step S430). It should be noted that the key algorithm used in step S430 is adapted for information security and integrity protection. In some embodiments, it is possible that the audio watermark signal $W_B$ is not added to the watermark key $k_w^B$, and the original watermark $w_0^B$ may be directly used as the audio watermark signal $W_B$.

It should be noted regarding how to obtain the speech signal $S_a'$, the speech signal $S_A$, and the audio watermark signal $W\neg_A$ for the conference terminal 10*a*, please refer to the foregoing description of the speech signal $S_b'$, the speech signal $S_B$, and the audio watermark signal $W\neg_B$, which will not be repeated here. For example, the cloud server 50 may generate an audio watermark signal $W_A$ based on an original watermark $w_0^A$ and a watermark key $k_w$A to be transmitted.

In one embodiment, the original watermark $w_0^A$ and the audio watermark signal $W\neg_A$ are used to identify the conference terminal 10*a*, or the original watermark $w_0^B$ and the audio watermark signal $W_B$ are used to identify the conference terminal 10*c*. For example, the audio watermark signal $W\neg_A$ is a sound that records an identification code of the conference terminal 10*a*. However, in some embodiments, the present disclosure does not limit the content of the audio watermark signals $W\neg_A$ and $W\neg_B$.

In FIG. 3, the cloud server 50 transmits the received speech signal $S_B$ and the received audio watermark signal $W_B$ to the conference terminal 10*a* via the network interface, and the conference terminal 10*a* receives the speech signal $S_B$ and the audio watermark signal $W_B$ and transmits it to the conference terminal 10*a* (step S370). Alternatively, the cloud server 50 may transmit the received speech signal $S_A$ and the audio watermark signal $W_A$ to the conference terminal 10*c*, and the conference terminal 10*c* receives the speech signal $S_A$ and the audio watermark signal $W_A$ and transmits them to the conference terminal 10*c*.

In one embodiment, the processor 19 receives network packets through the communication transceiver 15 via the network. This network packet includes both the speech signal $S_B$ and the audio watermark signal $W_B$. The processor 19 may identify the speech signal $S_B$ and the audio watermark signal $W_B$ based on an identifier in the network packet. This identifier is adapted to indicate that a certain part of the data load of the network packet is the speech signal $S_B$ while the other part is the audio watermark signal $W_B$. For example, the identifier indicates the starting position of the speech signal $S_B$ and the audio watermark signal $W_B$ in the network packet.

In one embodiment, the processor 19 receives a first network packet through the communication transceiver 15 via the network. This first network packet includes the speech signal $S_B$. And the processor 19 receives a second network packet through the communication transceiver 15 via the network. This second network packet includes the audio watermark signal $W_B$. In other words, the processor 19 distinguishes the speech signal $S_B$ and the audio watermark signal $W_B$ through two or more network packets.

In FIG. 2, the processor 19 assigns the speech signal $S_B$ to the host path to output the speech signal $S_B'$ (step S231), and assigns the audio watermark signal $W_B$ to the offload path to output the audio watermark signal $W_B$ (step S233). Specifically, the conference device 10*a* may provide one or more digital signal processing (DSP) effects to the audio stream. Digital signal processing effects are, for example, equalization processing, reverb, echo cancellation, gain control, or other audio processing. These sound effects may also be further packetized into one or more audio processing objects (APOs), such as stream effects (SFX), mode effects (MFX), and endpoint effects (EFX).

Figure 5:
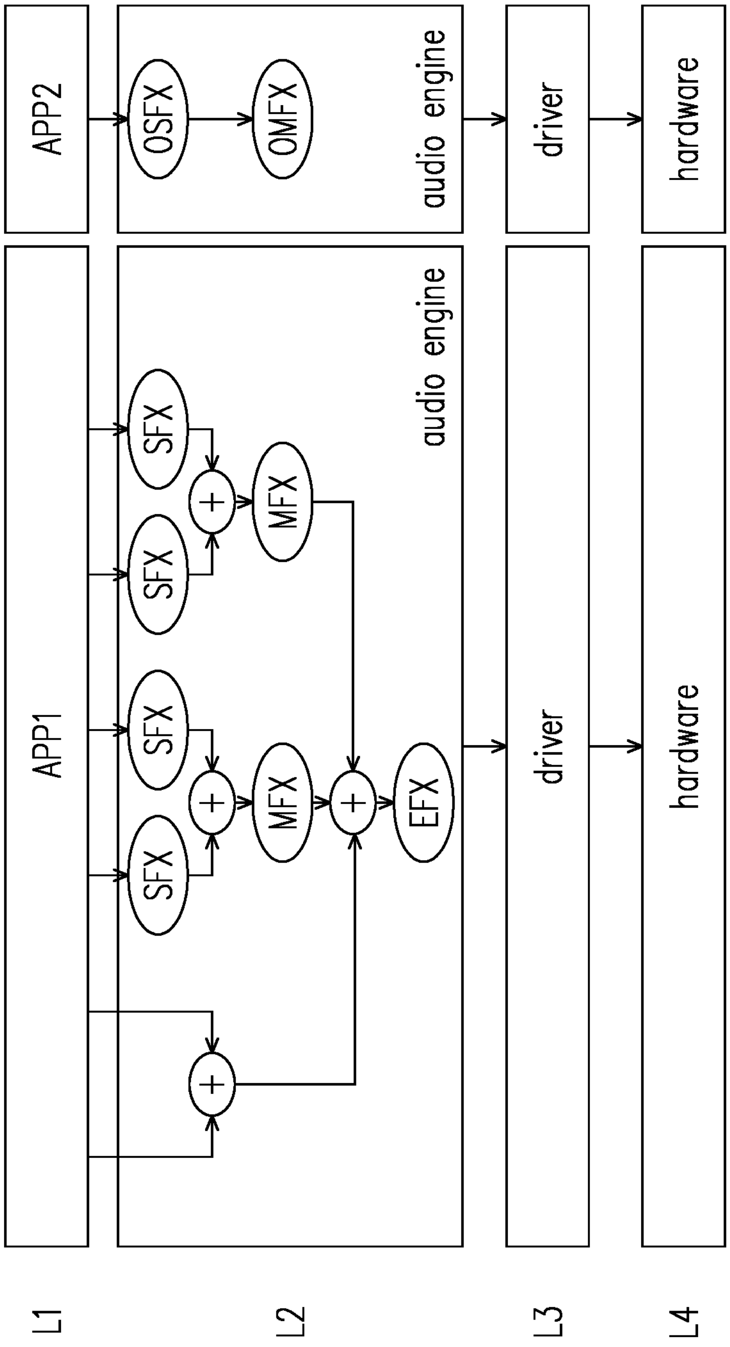
FIG. 5 is a schematic diagram of an audio processing architecture according to an embodiment of the disclosure.

FIG. 5 is a schematic diagram of an audio processing architecture according to an embodiment of the disclosure. In FIG. 5, in the audio processing architecture, a first layer L1 is applications APP1 and APP2, a second layer L2 is the audio engine, a third layer L3 is the driver, and a fourth layer L4 is the hardware. The application APP1 may be referred to as the primary application. For the application APP1, the audio engine provides stream effects SFX, mode effects MFX, and endpoint effects EFX. The application APP2 may be referred to as the secondary application that provides system pins to the driver. For the application APP2, the audio engine provides the offload stream effects (OSFX) and the offload mode effects (OMFX) that provides offload pins to the driver.

In the embodiment of the present disclosure, the host path provides more digital signal processing (DSP) effects than the offload path. It can be seen that, compared to the speech signal $S_B$, the audio watermark signal $W_B$ may not be subjected to digital signal processing effects or is subjected to less digital signal processing effects. For example, the processor 19 performs noise suppression on the speech signal $S_B$, but the audio watermark signal $W_B$ is not subjected to noise suppression. Or, the audio watermark signal $W_B$ may only be subjected to gain adjustment without undergoing the voice-related signal processing.

It should be noted that FIG. 2 shows that the processor 19 performs the receiving end speech signal processing on the speech signal $S_B$, while the audio watermark signal $W_B$ does not receive the receiving end speech signal processing (that is, the output of the offload path is still the audio watermark signal $W_B$). However, in some embodiments, the audio watermark signal $W_B$ may also receive part of the receiving end speech signal processing (i.e., the output of the offload path is the new audio watermark signal $W_B$).

In one embodiment, the host path is configured for major applications such as voice calls or multimedia playback, such as the media player or call software in the Windows system. The offload path is configured for secondary applications like notification sounds, ringtones, or music playback, such as a simple music player. The processor 19 may connect the speech signal $S_B$ with the primary application, so that the speech signal $S_B$ may be input to the host path used by the primary application, whereas the processor 19 may connect the audio watermark signal $W_B$ with the secondary application, so that the audio watermark signal $W_B$ may be input to the offload path used by the secondary application.

In one embodiment, the primary processor 191 performs signal processing on the host path, and the secondary processor 193 performs signal processing on the offload path. In other words, the primary processor 191 provides the digital signal processing effects corresponding to the host path to the speech signal $S_B$, and the secondary processor 193 provides the digital signal processing effects corresponding to the offload path for the audio watermark signal $W_B$. For example, the storage space provided by the secondary processor 193 for the mode effects is less than the storage space provided by the primary processor 191.

In FIG. 2, the processor 19 synthesizes the speech signal $S_B'$ and the audio watermark signal $W_B$ to output a synthesized audio signal $S_B'+W_B$ (step S250). For example, the processor 19 adds an audio watermark signal $W_B$ to the speech signal $S_B'$ through spread spectrum, echo hiding, phase encoding, etc. in the time domain to form the synthesized audio signal $S_B'+W_B$. Alternatively, the processor 19 may add the audio watermark signal $W_B$ to the speech signal $S_B'$ in the frequency domain by modulated carries, subtracting frequency bands, etc. The synthesized audio signal $S_B'+W_B$ can be used in an audio playback system 251. For example, the processor 19 plays the synthesized audio signal $S_B'+W_B$ through the loudspeaker 13, such that the audio playback system 251 may output an audio watermark signal $W_B$ that is complete or less distorted.

On the other hand, the processor 19 may obtain the speech signal $S_a$ of the speaker through an audio receiving system 271. For example, the processor 19 records through the sound receiver 11 to obtain the speech signal $S_a$. The processor 19 may perform transmission end speech signal processing on the speech signal $S_a$ to output the speech signal $S_a'$ (step S290), and transmit the speech signal $S_a'$ to the cloud server 50 through the communication transceiver 15. Similarly, the cloud server 50 may generate the speech signal $S_A$ and the audio watermark signal $W_A$ based on the speech signal $S_a'$. In addition, the conference terminal 10*c* may also output a complete or less distorted audio watermark signal $W_A$ through its loudspeaker 13.

In summary, in the conference device and the embedding method of audio watermarks of the embodiments of the present disclosure, the audio watermark signal and the speech signal are synthesized at the output end of the conference terminal to bypass the speech signal processing of the system to embed the audio watermark. In this configuration, the embodiment of the present disclosure provides a host path and an offload path, and makes the audio watermark signal receive less signal processing or not receive any signal processing. In this way, the terminal may play the user's speech signal and the audio watermark fully, and may reduce the noise in the environment.

Although the present disclosure has been disclosed in the above embodiments, it is not intended to limit the present disclosure. Anyone with ordinary knowledge in the relevant technical field can make changes and modifications without departing from the spirit and scope of the present disclosure. The scope of protection of the present disclosure shall be subject to those defined by the claims attached.

What is claimed is:

1. An embedding method of audio watermarks adapted for a conference terminal, and the embedding method of audio watermarks comprising:

receiving, by the conference terminal, a first speech signal from a first network packet via a network interface, and receiving, by the conference terminal, a first audio watermark signal from a second network packet via the network interface, wherein the first speech signal comprises a signal recorded from a voice of a speaker through another conference terminal, the first audio watermark signal corresponds to the another conference terminal;

processing, by the conference terminal, the first speech signal via a host path of the conference terminal through connecting the first speech signal with a first application in an application layer of an audio processing architecture to output a second speech signal, and processing, by the conference terminal, the first audio watermark signal via an offload path of the conference terminal through connecting the first audio watermark signal with a second application in the application layer of the audio processing architecture to output a second audio watermark signal, wherein an audio engine of the conference terminal has the host path and the offload path for providing audio processing objects (APOs) of the conference terminal implementing digital signal processing effects, the host path provides more digital signal processing effects than the offload path, the audio engine is located between the application layer and a driver layer of the audio processing architecture, the audio engine provides, for the first application, a stream effect, a mode effect, and an endpoint effect of the APOs with system pins to a driver of the driver layer in the host path, the audio engine provides, for the second application, an offload stream effect and offload mode effect of the APOs with offload pins to the driver of the driver layer in the offload path, and the first audio watermark signal is subjected to gain adjustment without undergoing voice-related signal processing;

adding the second audio watermark signal to the second speech signal to generate a synthesized audio signal; and playing the synthesized audio signal through a loudspeaker of the conference terminal.

2. The embedding method of audio watermarks according to claim 1, wherein the host path is adapted for voice calls or multimedia playback, and the offload path is adapted for prompt sound, ringtone, or music playback.

3. The embedding method of audio watermarks according to claim 1, further comprising:

performing signal processing on the host path through a primary processor; and performing signal processing on the offload path through a secondary processor.

4. The embedding method of audio watermarks according to claim 1, wherein the second audio watermark signal is a same as the first audio watermark signal via the offload path.

5. The embedding method of audio watermarks according to claim 3, wherein a storage space provided by the secondary processor for mode effects (MFXs) is less than a storage space provided by the primary processor.

6. A conference terminal, comprising:

a sound receiver, adapted to record sound;

a loudspeaker, adapted to play sound;

a communication transceiver, adapted to transmit or receive data;

a processor, coupled to the sound receiver, the loudspeaker, and the communication transceiver, and adapted to:

receive a first speech signal from a first network packet via a network interface, and receiving, by the conference terminal, and receiving, by the conference terminal, a first audio watermark signal from a second network packet via the network interface through the communication transceiver, wherein the first speech signal comprises a signal recorded from a voice of a speaker through another conference terminal, the first audio watermark signal corresponds to the another conference terminal;

process the first speech signal via a host path of the conference terminal through connecting the first speech signal with a first application in an application layer of an audio processing architecture to output a second speech signal, and process the first audio watermark signal via an offload path of the conference terminal through connecting the first audio watermark signal with a second application in the application layer of the audio processing architecture to output a second audio watermark signal, wherein an audio engine of the conference terminal has the host path and the offload path for providing audio processing objects (APOs) of the conference terminal implementing digital signal processing effects, the host path provides more digital signal processing effects than the offload path, the audio engine is located between the application layer and a driver layer of the audio processing architecture, the audio engine provides, for the first application, a stream effect, a mode effect, and an endpoint effect of the APOs with system pins to a driver of the driver layer in the host path, the audio engine provides, for the second application, an offload stream effect and offload mode effect of the APOs with offload pins to the driver of the driver layer in the offload path, and the first audio watermark signal is subjected to gain adjustment without undergoing voice-related signal processing;

add the second audio watermark signal to the second speech signal to generate a synthesized audio signal; and play the synthesized audio signal through the loudspeaker.

7. The conference terminal according to claim 6, wherein the host path is adapted for voice calls or multimedia playback, and the offload path is adapted for prompt sound, ringtone, or music playback.

8. The conference terminal according to claim 6, wherein the processor comprises:

a primary processor, adapted for performing signal processing on the host path; and a secondary processor, adapted for performing signal processing on the offload path.

9. The conference terminal according to claim 6, wherein the second audio watermark signal is a same as the first audio watermark signal via the offload path.

10. The conference terminal according to claim 8, wherein a storage space provided by the secondary processor for mode effects (MFXs) is less than a storage space provided by the primary processor.

* * * * *